US010013982B2

(12) United States Patent
Mizumoto et al.

(10) Patent No.: US 10,013,982 B2
(45) Date of Patent: Jul. 3, 2018

(54) CONVERSATION PROCESSING APPARATUS AND CONVERSATION PROCESSING METHOD

(71) Applicant: HONDA MOTOR CO., LTD., Tokyo (JP)

(72) Inventors: Takeshi Mizumoto, Wako (JP); Kazuhiro Nakadai, Wako (JP); Kenta Utsunomiya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/091,886

(22) Filed: Apr. 6, 2016

(65) Prior Publication Data

US 2016/0307570 A1    Oct. 20, 2016

(30) Foreign Application Priority Data

Apr. 16, 2015  (JP) .................................. 2015-084130

(51) Int. Cl.
  *G10L 15/00*    (2013.01)
  *G10L 17/06*    (2013.01)
  (Continued)

(52) U.S. Cl.
  CPC .............. *G10L 17/06* (2013.01); *G10L 17/02* (2013.01); *G10L 25/51* (2013.01)

(58) Field of Classification Search
  CPC ............... H04L 67/306; H04L 63/0876; G06F 17/3053; G06F 17/30702; G06F 17/30867;
  (Continued)

(56) References Cited

U.S. PATENT DOCUMENTS

| | | | | |
|---|---|---|---|---|
| 4,931,934 A | * | 6/1990 | Snyder .................. | G09B 19/00 434/236 |
| 5,025,471 A | * | 6/1991 | Scott ...................... | G10L 15/02 704/237 |

(Continued)

FOREIGN PATENT DOCUMENTS

| | | |
|---|---|---|
| JP | 2006-338529 | 12/2006 |
| JP | 2007-218933 | 8/2007 |

(Continued)

OTHER PUBLICATIONS

Yoshihiro Sejima et al., "Development of an Interaction-activated Communication Model Based on the Heat Conduction Equation in Voice Communication", The Japan Society of Mechanical Engineers, Sep. 7, 2013, Yamaguchi Univ. Graduate School of Science and Engineering, Yamaguchi, Japan, 4 pages, English abstract included.

(Continued)

*Primary Examiner* — Michael Ortiz Sanchez
(74) *Attorney, Agent, or Firm* — Rankin, Hill & Clark LLP

(57) ABSTRACT

A conversation processing apparatus includes a sound collection unit configured to collect voice signals of a plurality of speakers, a conversation recording unit configured to record the voice signals of the speakers collected by the sound collection unit, and a conversation analysis unit configured to calculate a degree to which a conversation between any two speakers is stimulated by analyzing the conversation between the two speakers from the voice signals recorded on the conversation recording unit.

11 Claims, 6 Drawing Sheets

(51) Int. Cl.
*G10L 25/51* (2013.01)
*G10L 17/02* (2013.01)

(58) Field of Classification Search
CPC .... G06F 3/167; G06F 17/2785; G06F 17/279; G06F 17/30976; G06F 2203/04808; G06F 3/012; G06F 3/16; G10L 15/22; G10L 25/63; G10L 2021/065; G10L 21/0364; G10L 15/26; G10L 15/265; G10L 19/00; G10L 21/0205; G10L 25/90; G10L 15/00; G10L 15/02; G10L 17/26; G10L 2021/0135; G10L 21/003; G10L 21/057; G10L 25/18

See application file for complete search history.

(56) References Cited

U.S. PATENT DOCUMENTS

| | | | | |
|---|---|---|---|---|
| 5,862,519 A * | 1/1999 | Sharma | ............... | G10L 15/04 704/231 |
| 6,011,851 A * | 1/2000 | Connor | ............... | H04S 1/002 379/202.01 |
| 6,151,571 A * | 11/2000 | Pertrushin | ............... | G10L 17/26 704/207 |
| 6,480,826 B2 * | 11/2002 | Pertrushin | ............... | G10L 17/26 704/270 |
| 7,222,075 B2 * | 5/2007 | Petrushin | ............... | G10L 17/26 379/88.01 |
| 7,475,013 B2 * | 1/2009 | Rifkin | ............... | G10L 17/02 382/215 |
| 8,666,672 B2 * | 3/2014 | Winarski | ............... | A61B 5/16 600/301 |
| 8,965,770 B2 * | 2/2015 | Petrushin | ............... | G10L 17/26 704/270 |
| 2010/0223056 A1 * | 9/2010 | Kadirkamanathan | ... | G10L 15/02 704/235 |
| 2012/0185244 A1 * | 7/2012 | Morita | ............... | G10L 25/93 704/207 |
| 2014/0258413 A1 * | 9/2014 | Brieskorn | ............... | H04M 3/567 709/204 |
| 2014/0372362 A1 * | 12/2014 | Miller | ............... | G06F 17/00 706/50 |
| 2016/0300252 A1 * | 10/2016 | Frank | ............... | G06Q 30/0203 |

FOREIGN PATENT DOCUMENTS

JP 2007-295104 11/2007
JP 2013-058221 3/2013

OTHER PUBLICATIONS

Japanese Office Action, Notice of Reasons for Rejection dated Feb. 7, 2017, 6 pages, English translation included.

* cited by examiner

| RECORDING DATE AND TIME | |
|---|---|
| IDENTIFICATION INFORMATION | SEPARATED VOICE SIGNAL |
| IDENTIFICATION INFORMATION A | VOICE SIGNAL A |
| IDENTIFICATION INFORMATION B | VOICE SIGNAL B |
| IDENTIFICATION INFORMATION C | VOICE SIGNAL C |

CONVERSATION PROCESSING APPARATUS AND CONVERSATION PROCESSING METHOD

CROSS-REFERENCE TO RELATED APPLICATION

Priority is claimed on Japanese Patent Application No. 2015-084130, filed Apr. 16, 2015, the content of which is incorporated herein by reference.

BACKGROUND OF THE INVENTION

Field of the Invention

The present invention relates to a conversation processing apparatus and a conversation processing method.

Description of Related Art

An apparatus for picking up voices of a plurality of speakers of a conference using a plurality of microphones in a voice conference, performing a sound separation process on the picked-up voices, and recording utterance content of each speaker is proposed (for example, see Japanese Unexamined Patent Application, First Publication No. 2007-295104 (hereinafter, Patent Literature 1)).

Also, in group discussions performed in work, class, an employment interview, or the like, it is necessary to stimulate the conference and move the discussion forward. It is necessary to specify a central person stimulating the conference in a group discussion.

SUMMARY OF THE INVENTION

However, in the technology disclosed in Patent Literature 1, it is difficult to measure a degree to which a conference is stimulated.

An aspect according to the present invention has been made in view of the above-described point, and an objective of the present invention is to provide a conversation processing apparatus and a conversation processing method capable of measuring a degree to which a conference is stimulated.

The present invention adopts the following aspects to achieve the above-described objective.

(1) According to an aspect of the present invention, there is provided a conversation processing apparatus including: a sound collection unit configured to collect voice signals of a plurality of speakers; a conversation recording unit configured to record the voice signals of the speakers collected by the sound collection unit; and a conversation analysis unit configured to calculate a degree to which a conversation between any two speakers is stimulated by analyzing the conversation between the two speakers from the voice signals recorded on the conversation recording unit.

(2) In the aspect of the above-described (1), the degree of stimulation may be based on an influence of each of any two speakers on the conversation in time series.

(3) In the aspect of the above-described (1) or (2), the conversation analysis unit may calculate the degree of stimulation between any two speakers using a thermal equation.

(4) In the aspect of any one of the above-described (1) to (3), the conversation analysis unit may select all pairs of any two speakers for the plurality of speakers, calculate the degree of stimulation for each selected pair, generate a weighted complete graph constituted of nodes and edges using the calculated degree of stimulation for each pair for weights of the edges, and estimate a central person of the conversation on the basis of the generated weighted complete graph.

(5) In the aspect of any one of the above-described (1) to (4), the conversation analysis unit may normalize a volume for the voice signal in the conversation between any two speakers.

(6) In the aspect of the above-described (5), the conversation analysis unit may normalize the volume on the basis of a length of the voice signal spoken once for the voice signal in the conversation between any two speakers.

(7) In the aspect of any one of the above-described (1) to (6), the conversation analysis unit may calculate the degree of stimulation between any two speakers for every predetermined time.

(8) In the aspect of any one of the above-described (1) to (7), the conversation analysis unit may determine that the conversation is active when the degree of stimulation between any two speakers is greater than a predetermined threshold value.

(9) In the aspect of any one of the above-described (1) to (8), the conversation processing apparatus may include: a sound source localization unit configured to localize a sound source position using the voice signal collected by the sound collection unit; and a sound source separation unit configured to perform sound source separation on the basis of a result of the localization by the sound source localization unit, wherein the conversation recording unit records the voice signal of each speaker separated by the sound source separation unit.

(10) According to an aspect of the present invention, there is provided a conversation processing method including: collecting voice signals of a plurality of speakers; recording the voice signals of the speakers collected in the sound collection procedure; and calculating a degree to which a conversation between any two speakers is stimulated by analyzing the conversation between the two speakers from the voice signals recorded in the conversation recording procedure.

According to the aspects of the above-described (1) and (10), the degree of stimulation between the speakers can be measured using any two voice signals.

In the case of the above-described (2) and (3), the degree of stimulation can be calculated by solving the thermal equation in a thermal propagation model in which each utterance is input in time series when two speakers whose voice signals are extracted speak.

In the case of the above-described (4), the central person of the conversation can be estimated using the weighted complete graph.

In the case of the above-described (5) and (6), an influence of a volume difference can be reduced by normalizing volumes between two selected speakers even when there is a volume difference between the two selected speakers. In addition, in the case of (6), the degree of stimulation can be appropriately calculated even when the utterance of one speaker is long by normalizing the volume in consideration of an utterance time of one speaker.

In the case of the above-described (7), a temporal change in a degree of stimulation in a conference can be provided because the degree of stimulation can be calculated for every predetermined time.

In the case of the above-described (8), it can be determined whether the conference is stimulated.

In the case of the above-described (9), for example, the sound source separation unit performs sound source separation on voice signals collected by the microphone array and the degree of stimulation between speakers can be measured using any two voice signals among the separated voice signals.

DETAILED DESCRIPTION OF THE INVENTION (Overview of Invention)

The overview of the invention will be described.

In a conference in which a plurality of speakers participate, a conversation processing apparatus 1 (see FIG. 6) performs recording after separating sound sources for the utterances of the speakers. The conversation processing apparatus 1 sequentially selects the conversation of any two persons from recorded voices. For example, when participants in the conference are two persons A and B, there is one combination AB (=BA) of a selected pair. When the participants are three persons A, B, and C, there are three combinations AB (=BA), AC (=CA), and BC (=CB) of pairs to be selected. In this embodiment, a degree of stimulation indicating a degree to which the conversation is stimulated is calculated using a thermal propagation model by setting the conversation as the supply of heat and setting stimulation during the conversation as the propagation of heat in a space.

The conversation processing apparatus 1 calculates the degree of stimulation of the conversation each time using a thermal equation from voices of two selected persons. The conversation processing apparatus 1 generates a weighted complete graph using the calculated degree of stimulation. The conversation processing apparatus 1 estimates a central person of each predetermined time in the conference by calculating a degree of contribution of each predetermined time of the utterance in the conference (hereinafter referred to as a degree of utterance contribution) using the generated weighted complete graph. Also, the predetermined time is, for example, 1 sec.

<Description of Degree of Stimulation>

First, the degree of stimulation used in this embodiment will be described.

Figure 1:
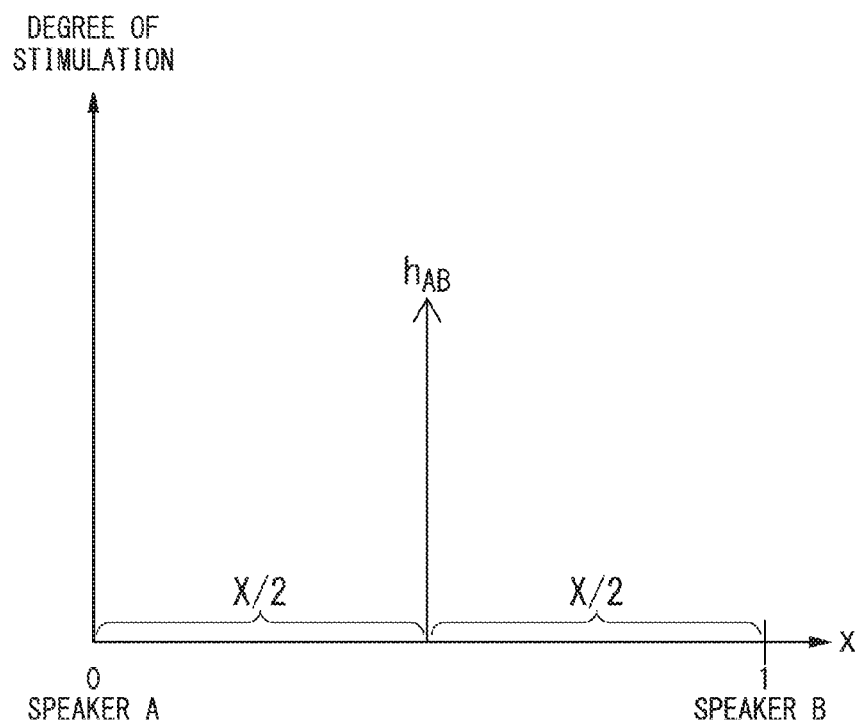
FIG. 1 is a diagram illustrating a degree-of-stimulation model when the number of speakers is two according to an embodiment.

FIG. 1 is a diagram illustrating a degree-of-stimulation model when the number of speakers is two according to this embodiment. In FIG. 1, the horizontal axis is an x-axis direction and represents a position at which the speaker is located. In addition, the vertical axis represents a degree of stimulation.

As illustrated in FIG. 1, the speaker A is located at one end (=0) on an x-axis and the speaker B is located at the other end (=1). In this embodiment, the thermal propagation model is used as a degree-of-stimulation model.

Thereby, the utterance of the speaker A corresponds to heat applied from x=0 and the utterance of the speaker B corresponds to heat applied from x=1. In this degree-of-stimulation model, an amount of heat is supplied from one side of x=0 or x=1 at which the speaker is located when one of the two persons speaks. In addition, when neither of the two speakers speaks, an amount of heat supplied from both ends is reduced.

In this embodiment, as illustrated in FIG. 1, a temperature u in the thermal equation is defined as a degree of stimulation $h_{AB}$ at a position of a center (x/2) between the speakers A and B. The subscript AB represents the speakers A and B.

Next, a voice signal supplied to the degree-of-stimulation model will be described.

First, the terms to be used in this embodiment will be defined.

The number of participants of the conference is denoted by M and a serial number of an individual speaker is denoted by $m (\in \{1, \ldots, M\})$. In one conference, the total number of utterances spoken by a speaker m is set as $I_m$ and a serial number of utterance of the speaker m is set as $i_m (\in \{1, \ldots, I_m\})$.

An utterance start time of utterance $i_m$ by the speaker m is set as $t_{im}$. In addition, a volume (hereinafter also referred to as utterance volume) of an $i_m^{th}$ utterance of the speaker m is set as $V_{im}$.

Here, an example in which the number of speakers is 2 (=M) will be described.

Speaker 1 speaks at time $t_{i1}$, and thus a volume $v_{i1}$ is supplied from one end of the degree-of-stimulation model.

Speaker 2 speaks at time $t_{i2}$ after time $t_{i1}$, and thus a volume $v_{i2}$ is supplied from the other end of the degree-of-stimulation model.

Hereinafter, when speaker 1 or 2 speaks, a volume $v_{im}$ is sequentially supplied from the end portion of the degree-of-stimulation model.

Next, the calculation of the degree of stimulation will be described.

The thermal equation when a conductor is on a number line x is represented as in the following Formula (1).

$$\frac{\partial u}{\partial t} = \frac{K}{c\rho} \frac{\partial^2 u}{\partial x^2} = a \frac{\partial^2 u}{\partial x^2} \quad (1)$$

In Formula (1), c denotes specific heat of the conductor, ρ denotes a density of the conductor, u denotes a temperature of a position x in the conductor, K denotes heat conductivity, and a denotes thermal diffusivity. In this embodiment, the temperature u is replaced with a degree of stimulation of the conversation $h_{AB}$ between the speakers A and B and the thermal diffusivity a is replaced with conversation diffusivity D. It is shown that a propagation speed of the conversation is faster when the value of the conversation diffusivity D is larger and the propagation speed of the conversation is slower when the value of the conversation diffusivity D is smaller. In addition, in this embodiment, an amount of given heat is replaced with an amount of utterance. As a result, Formula (1) is replaced with Formula (2).

$$\frac{\partial h_{AB}}{\partial t} = D \frac{\partial^2 h_{AB}}{\partial x^2} \qquad (2)$$

When a position of one end to which utterance is supplied is set to 0 and a position of the other end is set to 1, a boundary condition in Formula (2) is represented by the following Formulas (3). As shown in Formulas (3), a degree of stimulation $h_{AB}$ of the conversation at time 0 is assumed to be 0.

$$h_{AB}(0,t) = f_1(t)$$

$$h_{AB}(1,t) = f_2(t)$$

$$h_{AB}(x,0) = 0 \qquad (3)$$

Figure 2:
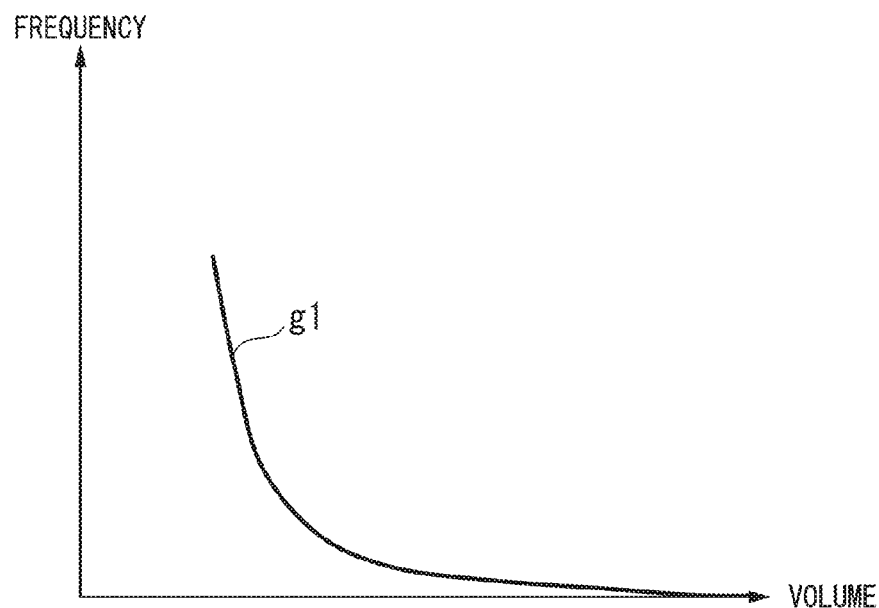
FIG. 2 is a diagram illustrating an example of a Pareto distribution for use in normalization according to an embodiment.

In Formulas (3), $f_1(t)$ is a function indicating an influence of the speaker A on the degree of stimulation $h_{AB}$ of the conversation and is a function based on a degree and frequency of utterance by the speaker A. In addition, $f_2(t)$ is a function indicating an influence of the speaker B on the degree of stimulation $h_{AB}$ of the conversation and is a function based on a degree and frequency of utterance by the speaker B. That is, in this embodiment, amounts of heat (=amounts of utterance) $f_1(t)$ and $f_2(t)$ supplied from both ends change with time t. In addition, in this embodiment, the functions $f_1(t)$ and $f_2(t)$ are normalized by causing a volume of a voice signal of the speaker to follow a Pareto distribution as illustrated in FIG. 2 in consideration of a volume difference of voice signals between the speakers. In addition, in this embodiment, normalization is performed by setting a volume in a range from 0 to 1.

FIG. 2 is a diagram illustrating an example of a Pareto distribution for use in normalization according to an embodiment.

In FIG. 2, the horizontal axis represents a volume and the vertical axis represents a frequency of utterance. In addition, a curve g1 is a curve of the Pareto distribution to be used when the volume is normalized.

Also, the example illustrated in FIG. 2 is one example and a distribution for use in the normalization is not limited to the Pareto distribution but other statistical distributions may be used.

Further, it is assumed that the conference is not stimulated, that is, a degree of stimulation $h_{AB}$ decreases more, when a time in which only one of the speakers speaks is longer. Thus, it is desirable that a given amount of utterance decrease more when utterance of one speaker is longer. Thus, in this embodiment, functions $f_1(t)$ and $f_2(t)$ to be normalized in proportion to the volume and exponentially decreased according to a length of a conversation are defined. As this result, the functions $f_1(t)$ and $f_2(t)$ are represented as in the following Formula (4).

$$f_m(t) = \sum_t v e^{-\alpha(t-t_i)} \qquad (4)$$

In Formula (4), m denotes 1 or 2 and t denotes time. In addition, v denotes a value of a normalized volume and $t_i$ denotes an utterance start time. Also, α denotes an attenuation constant representing a decrease of contribution of utterance 1 according to passage of time from the utterance start time $t_1$. That is, the attenuation constant α is a coefficient representing a decrease of activation by continuation of utterance by a specific speaker without a change of the speaker. As described above, Formula (4) represents a sum for every "conversation" formed of a set of a plurality of "utterances."

In this embodiment, the above-described calculated degree of stimulation $h_{AB}$ is used as a weight of an edge in a graph. In the case of two speakers A and B, nodes are A and B and a weight of an edge between the nodes A and B is a degree of stimulation $h_{AB}$.

<Example of Temporal Change in Degree of Stimulation>

Next, an example of a temporal change in a degree of stimulation $h_{AB}$ in a conversation between the speakers A and B will be described.

Figure 3:
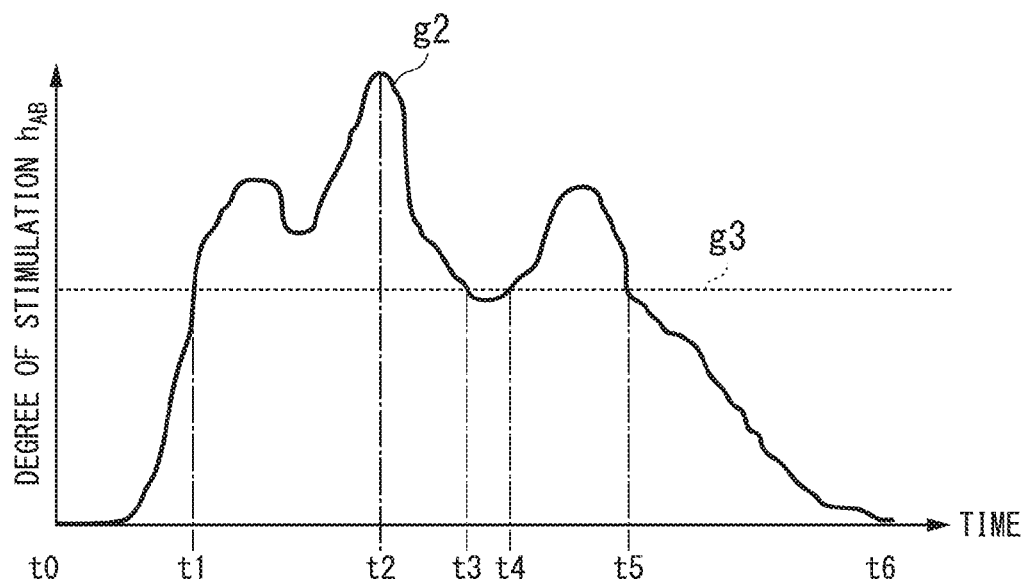
FIG. 3 is a diagram illustrating an example of a temporal change in a degree of stimulation $h_{AB}$ in a conversation between speakers A and B according to an embodiment.

FIG. 3 is a diagram illustrating an example of a temporal change in a degree of stimulation $h_{AB}$ in a conversation between speakers A and B according to this embodiment. In FIG. 3, the horizontal axis represents time and the vertical axis represents a degree of stimulation $h_{AB}$. Also, a curve g2 represents a degree of stimulation $h_{AB}(t)$ for the time and a broken line g3 represents a threshold value to be used when it is determined whether the conversation is stimulated.

In the example illustrated in FIG. 3, a conference is performed between times t0 and t6 and a period of times t1 to t3 and a period of times t4 and t5 which are periods of the threshold value g3 or more are periods in which it is determined that the conversation is stimulated. In addition, in the example illustrated in FIG. 3, time t2 is a time at which the degree of stimulation $h_{AB}(t)$ is the largest.

<Description when the Number of Speakers is Three>

Next, the case of three speakers A, B, and C will be described.

Figure 4:
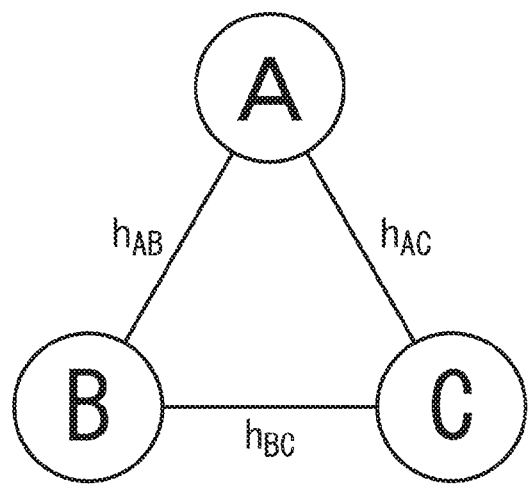
FIG. 4 is a diagram illustrating a weighted complete graph when the number of speakers is three according to an embodiment.

When the number of speakers is three, the conversation processing apparatus 1 sequentially extracts voice signals of speakers A and B, voice signals of speakers A and C, and voice signals of speakers B and C from recorded voice signals. The conversation processing apparatus 1 calculates degrees of stimulation $h_{AB}$, $h_{AC}$, and $h_{BC}$ between two speakers by replacing $h_{AB}$ with $h_{AC}$ or $h_{BC}$ in Formula (2). The conversation processing apparatus 1 generates a weighted complete graph as illustrated in FIG. 4 using the calculated degrees of stimulation $h_{AB}$, $h_{AC}$, and $h_{BC}$. Also, the complete graph is a graph in which all nodes are connected by edges. The weighted graph is a graph in which weights are assigned to the edges. FIG. 4 is a diagram illustrating a weighted complete graph when the number of speakers is three according to this embodiment.

In the case of three speakers A, B, and C as illustrated in FIG. 4, nodes are A, B, and C, a weight of an edge between the nodes A and B is a degree of stimulation $h_{AB}$, a weight of an edge between the nodes A and C is a degree of stimulation $h_{AC}$, and a weight of an edge between the nodes B and C is a degree of stimulation $h_{BC}$.

Also, a weighted complete graph of four vertices (nodes) is used when the number of speakers is four, and a weighted complete graph of m vertices (nodes) is used when the number of speakers is m.

Next, an example of degrees of stimulation when the number of speakers is three will be described.

Figure 5:
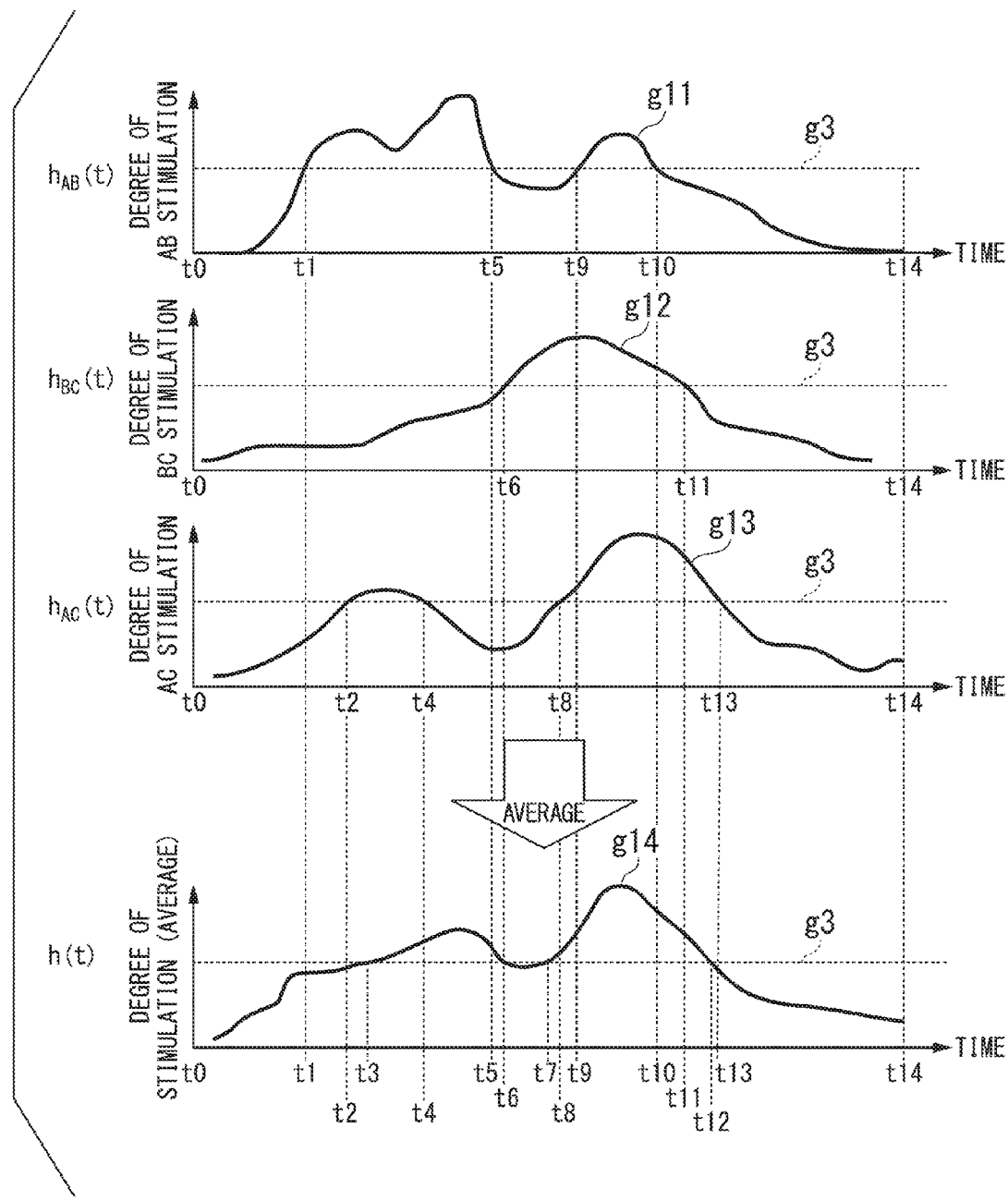
FIG. 5 is a diagram illustrating an example of temporal changes in degrees of stimulation $h_{AB}$, $h_{BC}$, and $h_{AC}$ in conversations of speakers A, B, and C and an average $\bar{h}$ of the three degrees of stimulation according to an embodiment.

FIG. 5 is a diagram illustrating an example of temporal changes in degrees of stimulation $h_{AB}$, $h_{BC}$, and $h_{AC}$ in conversations of speakers A, B, and C and an average $h^-$ of the three degrees of stimulation according to this embodiment.

In FIG. 5, the horizontal axis represents time and the vertical axis represents a degree of stimulation. A broken line g3 represents a threshold value to be used when it is determined whether the conversation is stimulated. A curve g11 represents a degree of stimulation $h_{AB}(t)$ for a time in a conversation between the speakers A and B, a curve g12 represents a degree of stimulation $h_{BC}(t)$ for a time in a conversation between the speakers B and C, and a curve g13 represents a degree of stimulation $h_{AC}(t)$ for a time in a conversation between the speakers A and C. In addition, a curve g14 represents an average $h^-(t)(=\frac{1}{3}(h_{AB}(t)+h_{BC}(t)+h_{AC}(t))$ of degrees of stimulation $h_{AB}(t)$, $h_{BC}(t)$, and $h_{AC}(t)$.

In the example illustrated in FIG. 5, a conference is shown to be performed between times t0 to t14. The conversation is shown to be stimulated in a period of times t1 to t5 and a period of times t9 to t10 as indicated by the curve g11 for speakers A and B. The conversation is shown to be stimulated in a period of times t6 to t11 as indicated by the curve g12 for speakers B and C. The conversation is shown to be stimulated in a period of times t2 to t4 and a period of times t8 to t13 as indicated by the curve g13 for speakers A and C. The conversation is shown to be stimulated in a period of times t3 to t6 and a period of times t7 to t12 as indicated by the curve g14 for the speakers A, B, and C.

As illustrated in FIG. 5, according to this embodiment, it is also possible to measure a temporal change in a degree of stimulation by a combination of any two persons among participants of the conference as well as a time of stimulation in the entire conference. For example, if a speaker A participates in the conference when the conference is performed, a leader of the conference can refer to the measurement result when considering who is a better partner for the speaker A between the speakers B and C.

<Estimation of Speaker Contributing to Stimulation of Conference>

Next, the estimation of the speaker contributing to the stimulation of the conference will be described.

For example, the case of three speakers will be described. In the case of the three speakers A, B, and C, nodes in a graph are A, B, and C, and weights of edges are degrees of stimulation $h_{AB}$, $h_{BC}$, and $h_{AC}$ as described above. An adjacency matrix N of the weighted complete graph for the above-described three speakers is shown as the following Formula (5).

$$N = \begin{pmatrix} h_{AA} & h_{AB} & h_{AC} \\ h_{BA} & h_{BB} & h_{BC} \\ h_{CA} & h_{CB} & h_{CC} \end{pmatrix} = \begin{pmatrix} 0 & h_{AB} & h_{AC} \\ h_{BA} & 0 & h_{BC} \\ h_{CA} & h_{CB} & 0 \end{pmatrix}$$

Also, in the second term of Formula (5), degrees of stimulation $h_{AA}$, $h_{BB}$, and $h_{CC}$ are assumed to be 0 for the speaker himself/herself. In addition, a degree of stimulation $h_{xy}=h_{yx}$ (here, x, y∈{A, B, C}). As a result, the second term of Formula (5) is shown as the third term of Formula (5).

Here, all signs of eigenvector components for a maximum eigenvalue of a matrix in which all components are non-negative according to a Perron-Frobenius theorem are equal. Because all the components of an adjacency matrix N of the generated graph are non-negative as shown in Formula (5), all signs of the eigenvector components for the maximum eigenvalue are equal. In this embodiment, an eigenvector R for the maximum eigenvalue is defined as a degree of utterance contribution in the conversation.

The conversation processing apparatus 1 calculates the eigenvector R of the adjacency matrix N according to the following Formula (6).

$$\lambda R = NR \quad (6)$$

In Formula (6), $\lambda$ is a real number and represents an eigenvalue. The eigenvector R shown in Formula (6) is represented as the following Formula (7).

$$R = \begin{pmatrix} C_A \\ C_B \\ C_C \end{pmatrix} \quad (7)$$

In Formula (7), $C_A$ is a degree of utterance contribution of the speaker A, $C_B$ is a degree of utterance contribution of the speaker B, and $C_C$ is a degree of utterance contribution of the speaker C. Also, the degree of utterance contribution C represents a degree of contribution to stimulation of the conference. A speaker having a largest value of the degree of utterance contribution C is a central person of the conversation (see Reference Literature 1). In this embodiment, it is possible to analyze temporal transition of the central person of the conversation by calculating a degree of utterance contribution C for every predetermined time.

Also, a technique of calculating the above-described degree of utterance contribution C is one example, and the present invention is not limited thereto. The conversation processing apparatus 1 may be configured to calculate the degree of utterance contribution C using another technique of calculating the center according to graph theory.

[Reference Literature 1]"The PageRank Citation Ranking: Bringing Order to the Web," Lawrence Page, Sergey Brin, Rajeev Motwani, Terry Winograd, Stanford InfoLab., Technical Report, 1999

<Configuration of Conversation Processing Apparatus 1>

Next, the configuration of the conversation processing apparatus 1 will be described.

Figure 6:
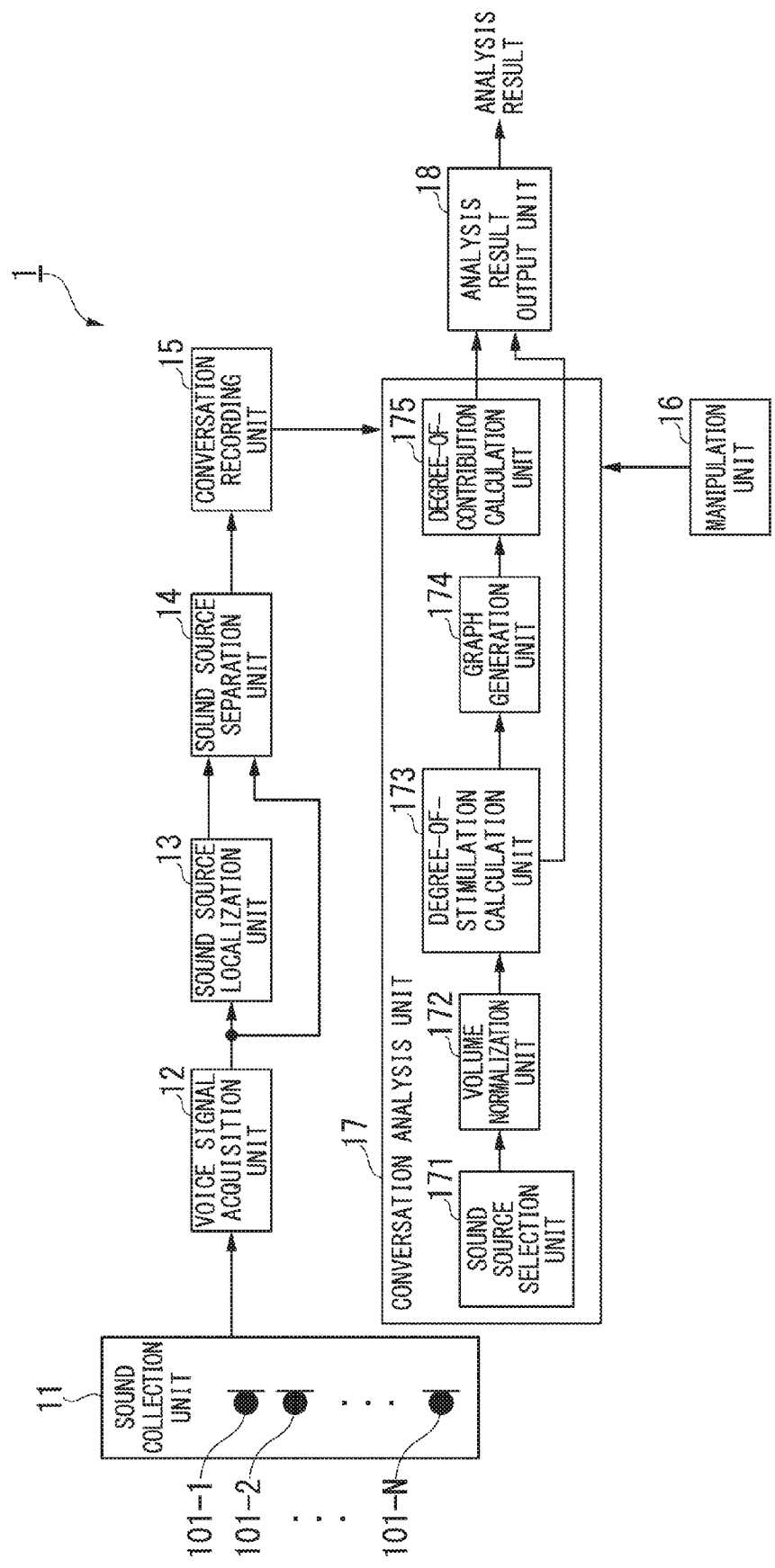
FIG. 6 is a block diagram illustrating a configuration of a conversation processing apparatus according to an embodiment.

FIG. 6 is a block diagram illustrating a configuration of the conversation processing apparatus 1 according to this embodiment.

As illustrated in FIG. 6, the conversation processing apparatus 1 includes a sound collection unit 11, a voice signal acquisition unit 12, a sound source localization unit 13, a sound source separation unit 14, a conversation recording unit 15, a manipulation unit 16, a conversation analysis unit 17, and an analysis result output unit 18.

The sound collection unit 11 is a microphone and includes microphones 101-1 to 101-N(N is an integer greater than or equal to 2). Also, the sound collection unit 11 may be a microphone array or a tiepin microphone (also referred to as a pin microphone) mounted for each speaker. Also, when no particular one of the microphones 101-1 to 101-N is specified, it is referred to as a microphone 101. The sound collection unit 11 converts the collected voice of the speaker into an electrical signal and outputs a converted voice signal to the voice signal acquisition unit 12. Also, the sound collection unit 11 may transmit recorded N-channel voice signals to the voice signal acquisition unit 12 wirelessly or by wire. It is only necessary to synchronize voice signals between channels during transmission.

The voice signal acquisition unit 12 acquires N voice signals recorded by the N microphones 101 of the sound collection unit 11. The voice signal acquisition unit 12 generates an input signal of a frequency domain by performing a Fourier transform on the acquired N voice signals for every frame in a time domain. The voice signal acquisition unit 12 outputs the N voice signals on which the Fourier transform is performed to the sound source localization unit 13 and the sound source separation unit 14.

The sound source localization unit 13 performs estimation (referred to as sound source localization) of an azimuth angle of a sound source which is a speaker on the basis of N voice signals input from the voice signal acquisition unit 12. The sound source localization unit 13 outputs azimuth angle information of each estimated sound source to the sound source separation unit 14. The sound source localization unit 13, for example, estimates the azimuth angle using a multiple signal classification (MUSIC) method. Also, other sound source direction estimation schemes such as a beam forming method, a weighted delay and sum beam forming (WDS-BF) method, a generalized singular value decomposition-multiple signal classification (GSVD-MUSIC) method, etc. may be used in the estimation of the azimuth angle.

The sound source separation unit 14 acquires N voice signals output by the voice signal acquisition unit 12 and azimuth angle information of each sound source output by the sound source localization unit 13. The sound source separation unit 14 separates the acquired N voice signals into speaker-specific voice signals, for example, using a geometric high-order decorrelation-based source separation (GHDSS) method. Alternatively, the sound source separation unit 14 may perform a sound source separation process, for example, using an independent component analysis (ICA) method. The sound source separation unit 14 causes the conversation recording unit 15 to record identification information for identifying the speaker in association with the separated speaker-specific voice signal.

Also, the sound source separation unit 14 may separate the speaker-specific voice signal after noise and the voice signal of the speaker are separated, for example, using an indoor transfer function recorded on the unit itself. In this case, the sound source separation unit 14, for example, may calculate sound feature quantities for every N sound signals and perform separation into speaker-specific voice signals on the basis of the calculated sound feature quantities and the azimuth angle information input from the sound source localization unit 13.

Figures 7, 8:
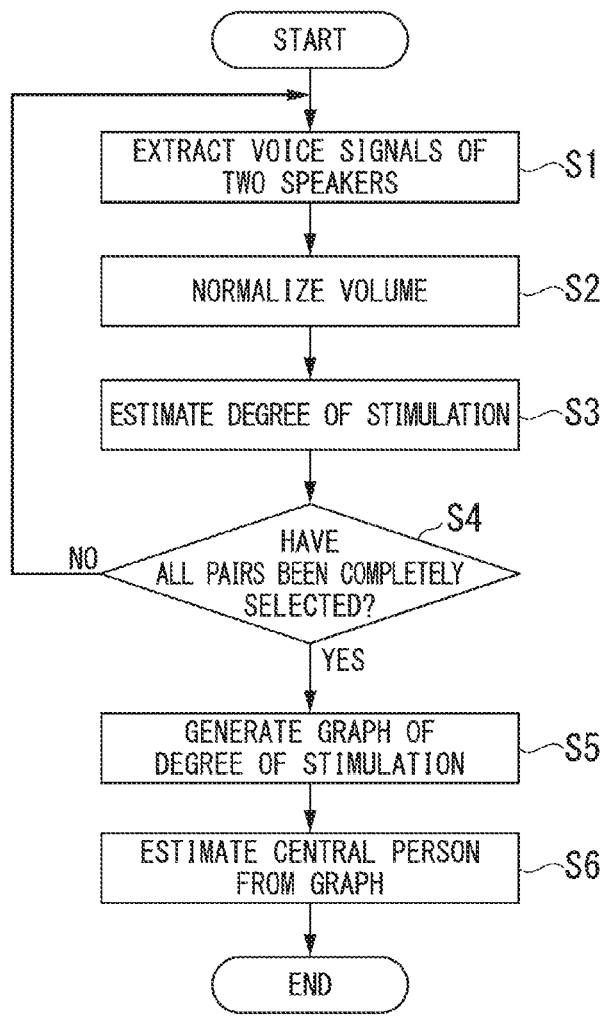
FIG. 7 is a diagram illustrating an example of information recorded on a conversation recording unit according to an embodiment.
FIG. 8 is a flowchart illustrating an example of a process to be performed by the conversation processing apparatus according to an embodiment.

As illustrated in FIG. 7, a date and time (recording date and time) on which voice signals of the conference are recorded and the separated voice signals and identification information for every speaker are associated and recorded on the conversation recording unit 15 for every conference. FIG. 7 is a diagram illustrating an example of information recorded on the conversation recording unit 15 according to this embodiment. The example illustrated in FIG. 7 is an example of three speakers. As illustrated in FIG. 7, identification information m (m is any one of A, B, and C) and a voice signal m are associated and the recording date and time are further associated and recorded. In the conversation recording unit 15, information illustrated in FIG. 7 is recorded for every conference.

The conversation processing apparatus 1 will be continuously described with reference to FIG. 6 again.

The manipulation unit 16 receives a manipulation of the user and outputs received manipulated manipulation information to the conversation analysis unit 17. The manipulation information, for example, includes conference selection information indicating a conference to be analyzed among recorded conferences, analysis start information indicating a start of analysis, etc.

The conversation analysis unit 17 includes a sound source selection unit 171, a volume normalization unit 172, a degree-of-stimulation calculation unit 173, a graph generation unit 174, and a degree-of-contribution calculation unit 175. Also, functional units of the conversation analysis unit 17 perform each process for every predetermined time.

The sound source selection unit 171 starts to analyze the conference according to analysis start information included in the manipulation information output by the manipulation unit 16. The sound source selection unit 171 reads a voice signal and identification information of an indicated conference from among conferences recorded on the conversation recording unit 15 according to conference selection information included in the manipulation information output by the manipulation unit 16. The sound source selection unit 171 sequentially selects any two voice signals from among read voices signals for all pairs according to the number of pieces of identification information. Specifically, in an example illustrated in FIG. 7, the conversation analysis unit 17 selects voice signals A and B of identification information A and B, voice signals B and C of identification information B and C, and voice signals A and C of the identification information A and C. The sound source selection unit 171 sequentially outputs the two selected voice signals and the identification information to the volume normalization unit 172. Also, the sound source selection unit 171 sequentially outputs voice signals of pairs according to the number of pieces of identification information to the volume normalization unit 172, for example, in time division, within a predetermined time.

The volume normalization unit 172 normalizes the volume by calculating functions $f_1(t)$ and $f_2(t)$ for every speaker using the above-described Formula (4) for two voice signals output by the sound source selection unit 171. The volume normalization unit 172 associates identification information with the calculated $f_1(t)$ and $f_2(t)$ and outputs the identification information associated with the calculated $f_1(t)$ and $f_2(t)$ to the degree-of-stimulation calculation unit 173. Also, the volume normalization unit 172 calculates the functions $f_1(t)$ and $f_2(t)$ for each of pairs of voice signals of combinations according to the number of pieces of identification information, for example, in time division, within a predetermined time.

The degree-of-stimulation calculation unit 173 calculates a degree of stimulation $h_{xy}(t)$ between two voice signals, that is, two speakers, by solving a thermal equation of Formula (2), for example, through a difference method, using the functions $f_1(t)$ and $f_2(t)$ output by the volume normalization unit 172 and a boundary condition of the above-described Formula (3). The degree-of-stimulation calculation unit 173 associates the calculated degree of stimulation $h_{xy}(t)$ with the identification information and sequentially outputs the calculated degree of stimulation $h_{xy}(t)$ associated with the identification information to the graph generation unit 174. For example, in the example illustrated in FIG. 7, the degree-of-stimulation calculation unit 173 associates the calculated degree of stimulation $h_{AB}$ and the selected identification information A and B, associates the calculated degree of stimulation $h_{BC}$ and the selected identification information B and C, and associates the calculated degree of stimulation $h_{Ac}$ and the selected identification information A and C, and outputs the degrees of stimulation associated with the identification information to the graph generation unit 174. Also, the degree-of-stimulation calculation unit 173 calculates the degree of stimulation $h_{xy}(t)$ for each of pairs of voice signals of combinations according to the number of pieces of identification information, for example, in time division, within a predetermined time.

In addition, the degree-of-stimulation calculation unit 173 calculates an average $h^-(t)$ (see FIG. 5) of degrees of stimulation for each of pairs of all speakers. The degree-of-stimulation calculation unit 173 generates an image representing a temporal change in the degree of stimulation $h_{xy}(t)$ for each pair as illustrated in FIG. 5 and an image representing a temporal change in an average $h^-(t)$ of degrees of stimulation using a threshold value stored in the unit itself, and outputs the generated images to the analysis result output unit 18.

The graph generation unit 174 generates a weighted complete graph using the degree of stimulation $h_{xy}(t)$ output by the degree-of-stimulation calculation unit 173 and the identification information in a well-known technique. The graph generation unit 174 generates an adjacency matrix N of the generated graph according to Formula (5) and outputs the generated adjacency matrix N to the degree-of-contribution calculation unit 175.

The degree-of-contribution calculation unit 175 calculates an eigenvector R for each predetermined time according to Formula (6) using the adjacency matrix N output by the graph generation unit 174. The degree-of-contribution calculation unit 175 estimates a central person of a conversation for every predetermined time on the basis of the calculated eigenvector R and outputs the estimated estimation result (for example, FIG. 10) to the analysis result output unit 18. Also, an example of the estimation result will be described below.

The analysis result output unit 18 outputs at least one of the image output by the degree-of-stimulation calculation unit 173 and the estimation result output by the degree-of-contribution calculation unit 175 as the analysis result to an external apparatus (not illustrated), a display unit (not illustrated) connected to the conversation processing apparatus 1, a printer (not illustrated) connected to the conversation processing apparatus 1, etc.

<Process to be Performed by Conversation Processing Apparatus 1>

Next, an example of a processing procedure to be performed by the conversation processing apparatus 1 will be described.

FIG. 8 is a flowchart illustrating an example of a process to be performed by the conversation processing apparatus 1 according to this embodiment. Also, in the following process, a voice signal during a conference is already acquired and speaker-specific voice signals obtained by sound source separation and identification information are recorded on the conversation recording unit 15. The following process is performed after the user indicates an analysis instruction for a voice signal of the conference through the manipulation unit 16.

(Step S1) The sound source selection unit 171 reads a voice signal and identification information of an indicated conference among conferences recorded on the conversation recording unit 15 according to conference selection information included in manipulation information output by the manipulation unit 16. Subsequently, the sound source selection unit 171 selects any two voice signals (voice signals of two speakers) from among read voice signals for all pairs according to the number of pieces of identification information.

(Step S2) The volume normalization unit 172 normalizes the volume by calculating functions $f_1(t)$ and $f_2(t)$ for every speaker using the above-described Formula (4) for two voice signals selected by the sound source selection unit 171.

(Step S3) The degree-of-stimulation calculation unit 173 estimates a degree of stimulation $h_{xy}(t)$ between two speakers by solving a thermal equation of Formula (2) using the functions $f_1(t)$ and $f_2(t)$ output by the volume normalization unit 172 and a boundary condition of the above-described Formula (3). Subsequently, the degree-of-stimulation calculation unit 173 calculates an average $h^-(t)$ of degrees of stimulation for each of pairs of all speakers and generates an image representing a temporal change in the degree of stimulation $h_{xy}(t)$ for each pair and an image representing a temporal change in an average degree of stimulation $h^-(t)$ using a threshold value stored in the unit itself.

(Step S4) The sound source selection unit 171 determines whether all pairs have been completely selected in step S1. When the sound source selection unit 171 determines that all the pairs have been completely selected (step S4: YES), the process proceeds to step S5. When the sound source selection unit 171 determines that not all pairs have not been completely selected (step S4: NO), the process returns to step S1.

(Step S5) The graph generation unit 174 generates a weighted complete graph in a well-known technique using a degree of stimulation $h_{xy}(t)$ estimated by the degree-of-stimulation calculation unit 173 and identification information.

(Step S6) The degree-of-contribution calculation unit 175 calculates an eigenvector R for each predetermined time according to Formula (6) using the adjacency matrix N for every two speakers and every predetermined time generated by the graph generation unit 174. Subsequently, the degree-of-contribution calculation unit 175 estimates a central person of a conversation for every predetermined time on the basis of the calculated eigenvector R. Subsequently, the analysis result output unit 18 outputs at least one of information indicating the central person of the conversation for each predetermined time estimated by the degree-of-contribution calculation unit 175 and the image generated by the degree-of-stimulation calculation unit 173 as an analysis result to an external apparatus (not illustrated), etc.

This ends the process performed by the conversation processing apparatus 1.

<Experiment Result>

Next, an example of the result of an experiment performed using the conversation processing apparatus 1 of this embodiment will be described.

The experiment was performed while recording a conference in which three speakers participated.

First, an example of a result of changing a value of conversation diffusivity D in the above-described Formula (2) will be described.

Figure 9:
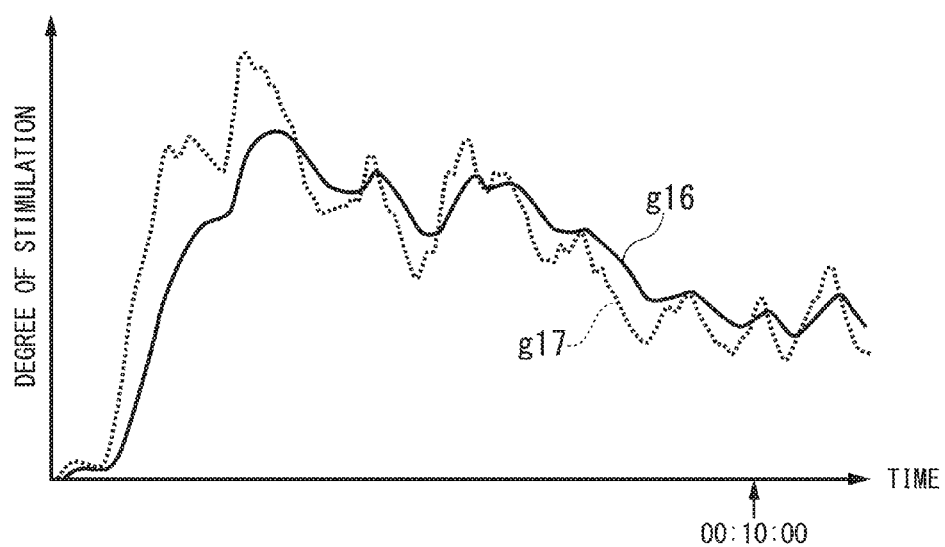
FIG. 9 is a diagram illustrating an example of a temporal change in a degree of stimulation $h_{xy}(t)$ when a value of conversation diffusivity D changes according to an embodiment.

FIG. 9 is a diagram illustrating an example of a temporal change in a degree of stimulation $h_{xy}(t)$ to which the value of the conversation diffusivity D changes according to an embodiment. In FIG. 9, the horizontal axis represents time and the vertical axis represents a degree of stimulation.

In the example illustrated in FIG. 9, a curve g16 is an example in which the value of the conversation diffusivity D is 1, and a curve g17 is an example in which the value of the conversation diffusivity D is 20. As illustrated in FIG. 9, a temporal change in the degree of stimulation $h_{xy}(t)$ becomes a smoother curve when the value of the conversation diffusivity D is smaller.

The value of the conversation diffusivity D and the threshold value to be used when it is determined whether the conference is stimulated may be preset by the user of the conversation processing apparatus 1. Alternatively, the temporal change in the degree of stimulation $h_{xy}(t)$ as illustrated in FIG. 9 may be displayed on a display unit (not illustrated) connected to the conversation processing apparatus 1 and the user may set the conversation diffusivity D by manipulating the manipulation unit 16 while viewing a displayed image. In this case, for example, the correspondence between the value of the conversation diffusivity D and the threshold value may be stored in the degree-of-contribution calculation unit 175.

Next, an example of an estimation result estimated by the degree-of-contribution calculation unit 175 for a conversation among three speakers will be described.

Figure 10:
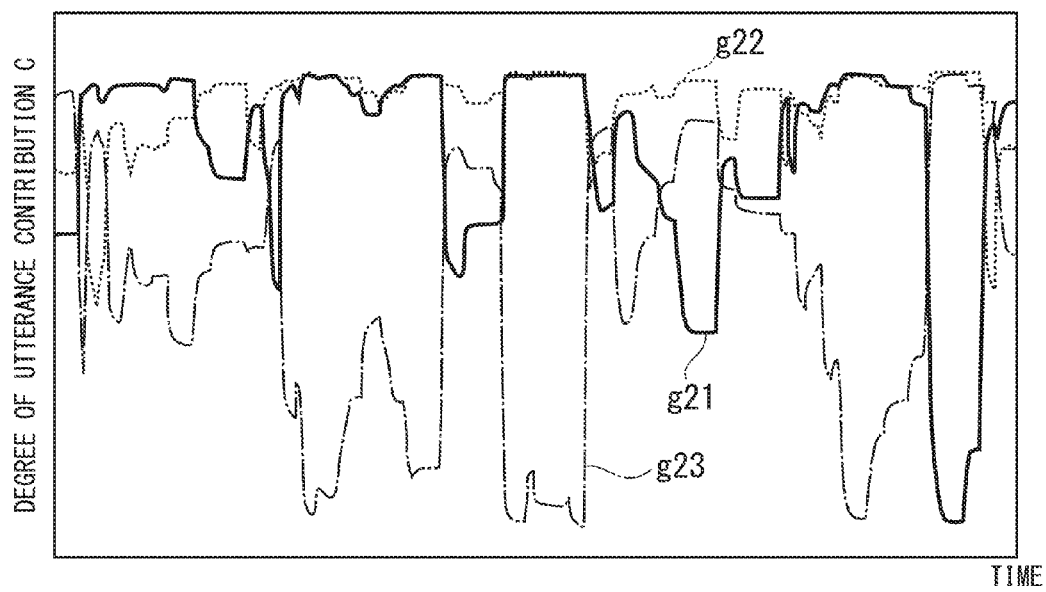
FIG. 10 is a diagram illustrating an example of estimation results estimated by a degree-of-contribution calculation unit for conversations of three speakers according to an embodiment.

FIG. 10 is a diagram illustrating the example of the estimation result estimated by the degree-of-contribution calculation unit 175 for the conversations of the three speakers according to this embodiment. In FIG. 10, the horizontal axis represents time and the vertical axis represents a degree of utterance contribution C.

In the example illustrated in FIG. 10, a curve g21 represents a degree of utterance contribution $C_A$ of a speaker of identification information A, a curve g22 represents a degree of utterance contribution $C_B$ of a speaker of identification information B, and a curve g23 represents a degree of utterance contribution $C_C$ of a speaker of identification information C.

In the example illustrated in FIG. 10, it is shown that the speaker B corresponding to the identification information B has the highest degree of utterance contribution C, the speaker A corresponding to the identification information A has the second highest degree of utterance contribution C, and the speaker C corresponding to the identification information C has a lower degree of utterance contribution C than the other two speakers.

In addition, in the example illustrated in FIG. 10, it can be seen that the degree of utterance contribution $C_A$ of the speaker A is high at the time of the beginning of the conference, but the degree of utterance contribution $C_B$ of the speaker B is higher than the degree of utterance contribution $C_A$ after the time of the beginning of the conference and the degree of utterance contribution $C_B$ of the speaker B is high thereafter.

The user can know a time-specific change in the central person of the conference and the central person stimulating the conference in the entire conference using the estimation result as in FIG. 10 output from the conversation processing apparatus 1.

Also, the example of the estimation result illustrated in FIG. 10 is one example and a method of representing the estimation result is not limited thereto. For example, the analysis result output unit 18 may be configured to arrange and display images of speaker-specific changes in which the horizontal axis represents time and the vertical axis represents a degree of utterance contribution C in three-dimensional images as an estimation result.

As described above, the conversation processing apparatus 1 of this embodiment includes a sound collection unit 11 configured to collect voice signals of a plurality of speakers; a conversation recording unit 15 configured to record the voice signals of the speakers collected by the sound collection unit; and a conversation analysis unit 17 configured to calculate a degree to which a conversation between any two speakers is stimulated by analyzing the conversation between the two speakers from the voice signals recorded on the conversation recording unit.

Through this configuration, according to the present invention, it is possible to measure a degree of stimulation between speakers using any two voice signals.

Also, in the conversation processing apparatus 1 of this embodiment, the degree of stimulation is based on an influence of each of any two speakers on the conversation in time series.

Also, in the conversation processing apparatus 1 of this embodiment, the conversation analysis unit 17 calculates the degree of stimulation between any two speakers using a thermal equation (for example, Formula (2)).

Through this configuration, each utterance is input to a thermal propagation model in time series when two speakers whose voice signals are extracted speak. In this embodiment, the degree of stimulation can be calculated by solving the thermal equation in the thermal propagation model.

Also, in the conversation processing apparatus 1 of this embodiment, the conversation analysis unit 17 selects all pairs of any two speakers for the plurality of speakers, calculates the degree of stimulation for each selected pair, generates a weighted complete graph constituted of nodes and edges using the calculated degree of stimulation for each pair for weights of the edges, and estimates a central person of the conversation on the basis of the generated weighted complete graph.

Through this configuration, according to this embodiment, the central person of the conversation can be estimated using the weighted complete graph.

Also, in the conversation processing apparatus 1 of this embodiment, the conversation analysis unit 17 normalizes a volume for the voice signal in the conversation between any two speakers.

Also, in the conversation processing apparatus 1 of this embodiment, the conversation analysis unit 17 normalizes the volume on the basis of a length of the voice signal spoken once for the voice signal in the conversation between any two speakers.

Through this configuration, an influence of a volume difference can be reduced by normalizing volumes between two selected speakers even when there is a volume difference between the two selected speakers according to this embodiment. Also, according to this embodiment, the degree of stimulation can be appropriately calculated even when the utterance of one speaker is long by normalizing the volume in consideration of an utterance time of one speaker.

Also, in the conversation processing apparatus 1 of this embodiment, the conversation analysis unit 17 calculates the degree of stimulation between any two speakers for every predetermined time.

Through this configuration, a temporal change in a degree of stimulation in a conference can be provided because the degree of stimulation can be calculated for every predetermined time.

Also, in the conversation processing apparatus 1 of this embodiment, the conversation analysis unit 17 determines that the conversation is active when the degree of stimulation between any two speakers is greater than a predetermined threshold value.

Through this configuration, according to this embodiment, it can be determined whether the conference is stimulated.

Also, the conversation processing apparatus 1 of this embodiment further includes a sound source localization unit 13 configured to localize a sound source position using the sound signal collected by the sound collection unit 11;

and a sound source separation unit 14 configured to perform sound source separation on the basis of a result of the localization by the sound source localization unit, wherein the conversation recording unit 15 records the sound signal of each speaker separated by the sound source separation unit.

Through this configuration, for example, the sound source separation unit 14 performs sound source separation on voice signals collected by the microphone array and the degree of stimulation between speakers can be measured using any two voice signals among the separated voice signals.

Also, the conversation processing apparatus 1 described in this embodiment, for example, may be applied to an IC recorder and an apparatus for generating minutes. Also, the conversation processing apparatus 1 may be configured by installing an application for executing the conversation processing apparatus 1 in a smartphone, a tablet terminal, or the like.

The calculation of a degree of stimulation, the calculation of a degree of conversation contribution, the estimation of a central person of a conversation, etc. may be executed by recording a program for implementing the functions of the conversation processing apparatus 1 in the present invention on a computer-readable recording medium and causing a computer system to read and execute the program recorded on the recording medium. Also, the "computer system" used here is assumed to include an operating system (OS) and hardware such as peripheral devices. In addition, the computer system is assumed to include a World Wide Web (WWW) system having a homepage providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a constant period of time, such as a volatile memory (random access memory (RAM)) inside a computer system serving as a server or a client when the program is transmitted via a network such as the Internet or a communication circuit such as a telephone circuit.

In addition, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. In addition, the above-described program may be a program for implementing some of the above-described functions. Further, the above-described program may be a program, i.e., a so-called differential file (differential program), capable of implementing the above-described function in combination with a program already recorded on the computer system.

What is claimed is:

1. A conversation processing apparatus comprising:
a sound collection unit configured to collect voice signals of a plurality of speakers;
a conversation recording unit configured to record the voice signals of the speakers collected by the sound collection unit;
a conversation analysis unit configured to calculate a degree to which a conversation between any two speakers is stimulated by analyzing the conversation between the two speakers from the voice signals recorded on the conversation recording unit; and
an analysis result output unit configured to output an analysis result based on the degree of stimulation calculated by the conversation analysis unit for display,
wherein the conversation analysis unit normalizes a volume based on a length of the voice signal spoken once for the voice signal in the conversation between any two speakers and decreases the degree of stimulation according to passage of time, and
wherein the conversation analysis unit decreases the degree of stimulation according to a formula shown below:

$$f_m(t) = \sum_i v e^{-\alpha(t-t_i)}$$

where
$f_m(t)$ is a function indicating an influence of a speaker m on the degree of stimulation of the conversation,
m denotes 1 or 2,
t denotes time,
v denotes a value of a normalized volume,
$t_i$ denotes an utterance start time, and
α denotes an attenuation constant representing a degree of contribution of an utterance according to a passage of time from the utterance start time $t_i$.

2. The conversation processing apparatus according to claim 1, wherein the degree of stimulation is based on an influence of each of any two speakers on the conversation in time series.

3. The conversation processing apparatus according to claim 1, wherein the conversation analysis unit calculates the degree of stimulation between any two speakers using a thermal equation.

4. The conversation processing apparatus according to claim 1, wherein the conversation analysis unit selects all pairs of any two speakers for the plurality of speakers, calculates the degree of stimulation for each selected pair, generates a weighted complete graph constituted of nodes and edges using the calculated degree of stimulation for each pair for weights of the edges, and estimates a central person of the conversation on the basis of the generated weighted complete graph,
wherein the central person of the conversation is the analysis result.

5. The conversation processing apparatus according to claim 4, further comprising a display unit which receives and displays the analysis result output from the analysis result output unit.

6. The conversation processing apparatus according to claim 1, wherein the conversation analysis unit calculates the degree of stimulation between any two speakers for every predetermined time.

7. The conversation processing apparatus according to claim 1, wherein the conversation analysis unit determines that the conversation is active when the degree of stimulation between any two speakers is greater than a predetermined threshold value.

8. The conversation processing apparatus according to claim 1, comprising:

a sound source localization unit configured to localize a sound source position using the voice signal collected by the sound collection unit; and a sound source separation unit configured to perform sound source separation on the basis of a result of the localization by the sound source localization unit, wherein the conversation recording unit records the voice signal of each speaker separated by the sound source separation unit.

9. A conversation processing method comprising:

collecting voice signals of a plurality of speakers;

recording the voice signals of the speakers collected in the sound collection procedure;

calculating a degree to which a conversation between any two speakers is stimulated by analyzing the conversation between the two speakers from the voice signals recorded in the conversation recording procedure;

normalizing a volume based on a length of the voice signal spoken once for the voice signal in the conversation between any two speakers and decreasing the degree of stimulation according to passage of time, wherein the degree of stimulation is decreased according to a formula shown below:

$$f_m(t) = \sum_i v e^{-\alpha(t-t_i)}$$

where $f_m(t)$ is a function indicating an influence of a speaker m on the degree of stimulation of the conversation, m denotes 1 or 2, t denotes time, v denotes a value of a normalized volume, $t_i$ denotes an utterance start time, and $\alpha$ denotes an attenuation constant representing a degree of contribution of an utterance according to a passage of time from the utterance start time $t_i$; and displaying an analysis result output based on the degree of stimulation.

10. The conversation processing apparatus according to claim 1, further comprising a display unit which receives and displays the analysis result output from the analysis result output unit.

11. The conversation processing method according to claim 9, further comprising:

selecting all pairs of any two speakers for the plurality of speakers;

calculating the degree of stimulation for each selected pair;

generating a weighted complete graph constituted of nodes and edges using the calculated degree of stimulation for each pair for weights of the edges;

estimating a central person of the conversation on the basis of the generated weighted complete graph; and displaying the central person of the conversation as the output.

* * * * *